(No Model.)

C. D. TOWNE.
HARVESTER REEL.

No. 447,481. Patented Mar. 3, 1891.

Witnesses:
Walter S. Wood
Charles H. Garrett

Inventor.
Charles D. Towne
By Lucius C. West
Att'y.

UNITED STATES PATENT OFFICE.

CHARLES D. TOWNE, OF GALESBURG, MICHIGAN.

HARVESTER-REEL.

SPECIFICATION forming part of Letters Patent No. 447,481, dated March 3, 1891.

Application filed November 11, 1890. Serial No. 371,038. (No model.)

*To all whom it may concern:*

Be it known that I, CHARLES D. TOWNE, a citizen of the United States, residing at Galesburg, county of Kalamazoo, State of Michigan, have invented a new and useful Harvester-Reel, of which the following is a specification.

This invention more especially relates to an invention patented to me August 13, 1889, No. 408,999.

The object of the present invention consists in certain changes in construction in which the T-head of a T-shaped reel-rake acts in conjunction with the L-shaped reel-rakes, all as particularly described and claimed below.

Figure 1:
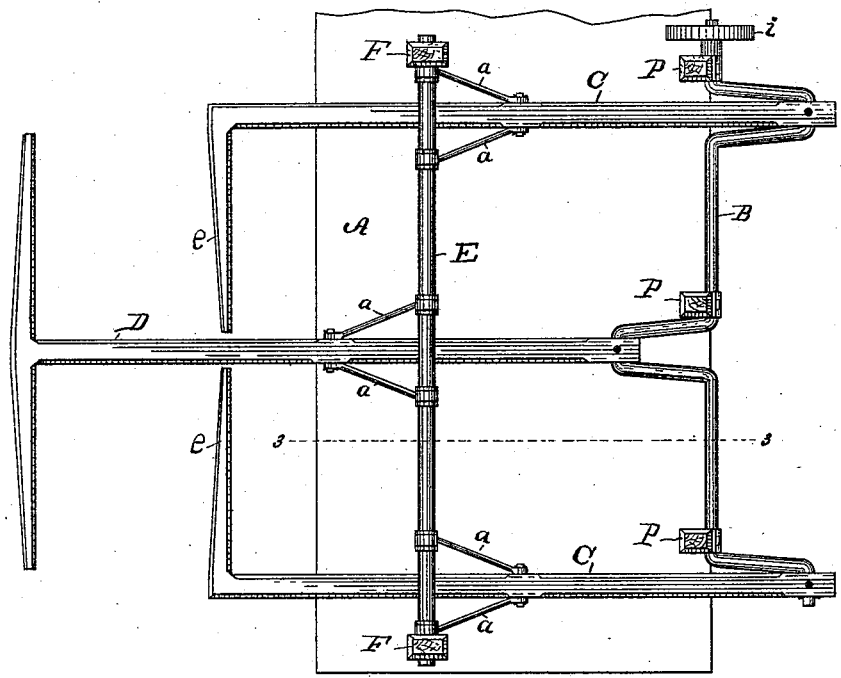
Figure 2:
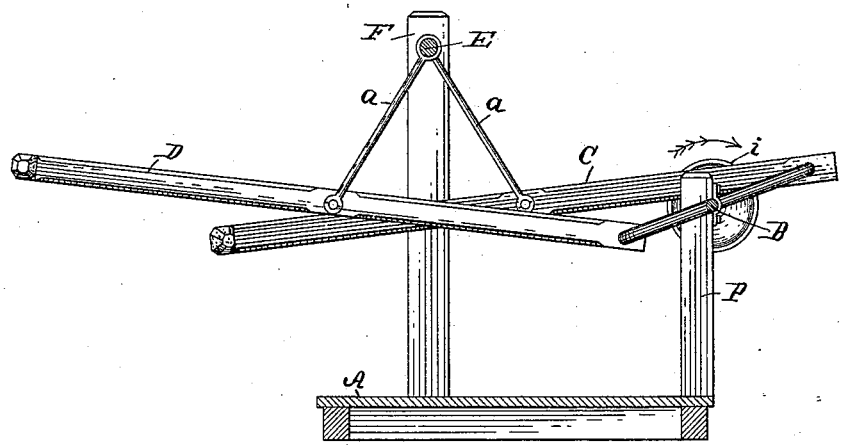

In the drawings, forming a part of this specification, Figure 1 is a plan view, and Fig. 2 is a sectional elevation on line 3 3 in Fig. 1.

To illustrate the changes from the prior invention above referred to, the L-shaped reel-rakes lap by each other in the former construction. In the present instance the free ends $e$ of the L-shaped reel-rakes C are on the same plane, and are separated from each other and do not lap by each other as in the prior invention, and the stem of the T-shaped reel-rake D in its operation plays between the separated ends $e$ of the rakes C. The rear ends of the reel-rakes C and D are pivotally attached each, respectively, to a crank of a revoluble shaft B, which shaft has bearings in the standards P.

In the operation, power will be applied to the pulley-wheel $i$, which is attached to the crank-shaft B.

It will be observed that the central crank of the shaft B is thrown out from the side of the shaft B opposite to that from which the end cranks are thrown out, for which reason the right-angled projections $e$ of the L-shaped reel-rakes C will strike into the grain alternately with the T-end of the reel-rake D. These reel-rakes C and D are fulcrumed by hangers $a$, which hangers are pivotally attached to a shaft E, said shaft being supported by standards F at a point between their free ends and their connections with the cranks of the shaft B. The standards P and F extend above the platform A and are supported by said platform.

The platform A in a grain-harvester would be the platform immediately in the rear of the sickle which cuts the grain. Hence it will be seen by the present construction that the two L-shaped reel-rakes strike into the grain and pull it back toward the sickle and onto the platform thereof as the sickle cuts it, and that the T-head of the reel-rake D also strikes into the grain and pulls it back and onto the platform A as the sickle cuts it, and that the operation of the L-shaped reel-rakes C and the T-rakes D alternate (in their operation) with each other.

Having thus described my invention, what I claim as new, and desire to secure by Letters Patent of the United States, is—

1. In a harvester-reel, the combination of the sickle-platform provided with the rear standards, a shaft having bearings in said standard, said shaft being provided with the cranks thrown out from opposite sides of said shaft, the L-shaped reel-rakes, and the center T-shaped reel-rake, the rear ends of said rakes being pivotally attached to the cranks of the power-shaft, a fulcrumed support between the power-shaft and the forward end of the grain-platform, said rakes being pivotally supported by hangers from said shaft, substantially as set forth.

2. In a reel-rake for harvesters, the combination of the L-shaped reel-rakes and the T-rake, a power crank-shaft to which said rakes are pivotally attached, and fulcrum-supports for said rakes, whereby the T-rakes and the L-rakes alternate in their movements in striking into the grain and reeling it back upon the grain-platform, substantially as set forth.

In testimony of the foregoing I have hereunto subscribed my name in presence of two witnesses.

CHARLES D. TOWNE.

Witnesses:
ETHAN B. KEITH,
GEO. H. FISHER.